United States Patent
Tomaschko et al.

(10) Patent No.: US 7,503,874 B2
(45) Date of Patent: Mar. 17, 2009

(54) AUTOMATIC OR AUTOMATED MOTOR VEHICLE TRANSMISSION AND METHOD FOR CONTROL THEREOF WITH AN EMERGENCY OPERATION AND A NORMAL OPERATION

(75) Inventors: Marc Tomaschko, Langenargen (DE); Johann Steinkellner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 435 days.

(21) Appl. No.: 11/518,008

(22) Filed: Sep. 7, 2006

(65) Prior Publication Data

US 2007/0054774 A1    Mar. 8, 2007

(30) Foreign Application Priority Data

Sep. 7, 2005    (DE) .................. 10 2005 042 347

(51) Int. Cl.
*B60W 10/06*    (2006.01)
(52) U.S. Cl. .................................. 477/107; 477/110
(58) Field of Classification Search .............. 477/107, 477/110, 115
See application file for complete search history.

(56) References Cited

U.S. PATENT DOCUMENTS

| | | | | |
|---|---|---|---|---|
| 5,002,032 A | * | 3/1991 | Kolberg | 123/399 |
| 5,243,527 A | * | 9/1993 | Kroger | 701/101 |
| 6,626,777 B1 | * | 9/2003 | Gierling | 474/18 |
| 6,632,157 B1 | | 10/2003 | Gierling et al. | |
| 7,044,889 B2 | * | 5/2006 | Habeck | 477/175 |

FOREIGN PATENT DOCUMENTS

| | | | |
|---|---|---|---|
| DE | 39 15 840 A1 | | 11/1989 |
| DE | 19703685 A1 | * | 8/1998 |
| DE | 198 44 618 A1 | | 3/2000 |
| DE | 100 33 647 A1 | | 1/2002 |
| DE | 19950663 A1 | * | 4/2008 |

\* cited by examiner

*Primary Examiner*—Ha D. Ho
(74) *Attorney, Agent, or Firm*—Davis & Bujold, P.L.L.C.

(57) ABSTRACT

An automatic or automated transmission of a motor vehicle and a method for control of the transmission in which in an emergency operation of the transmission a maximum admissible engine torque and a maximum admissible engine rotational speed of a prime mover of the motor vehicle connected or connectable with the transmission and a maximum admissible transmission input torque and a maximum admissible transmission rotational speed are limited compared to a normal operation. After a change from emergency operation back to normal operation of the transmission, a starting performance of the motor vehicle is time limited, especially limited in time and gradually limited depending on events.

25 Claims, No Drawings

AUTOMATIC OR AUTOMATED MOTOR VEHICLE TRANSMISSION AND METHOD FOR CONTROL THEREOF WITH AN EMERGENCY OPERATION AND A NORMAL OPERATION

This application claims priority from German Application Serial No. 10 2005 042 347.7 filed Sep. 7, 2005.

FIELD OF THE INVENTION

The invention concerns an automatic or automated motor vehicle transmission and a method for control of the transmission where during emergency operation of the transmission, the performance of the motor vehicle is limited in relation to during normal operation.

BACKGROUND OF THE INVENTION

In motor vehicles having a modern automatic transmission or an automated mechanical transmission, the utilization of the intelligence in the electronic system finds its expression in the use of an electronic transmission control with which the known criteria relevant for customers, such as driving comfort and driveability, and the criteria relevant to safety are to a great extent satisfied. For gear or ratio selection, depending on the situation, the electronic transmission control steadily communicates with other control units and computers of different aggregates of the motor vehicle, especially with an electronic control, usually via a CAN (Controller Area Network) database.

In case of a defect in the transmission or in the transmission control, as well as malfunction of the CAN database, emergency programs or alternative programs (alternative functions) are laid out so that in an emergency operation, the motor vehicle can be operated in the widest possible speed range, but sufficient mechanical and technical transmission protection are ensured even under extreme operation conditions.

From the practice different drafts for reducing the mechanical and thermal load of one such transmission in an emergency operation are already known. DE 198 44 618 A1, for example, has disclosed a method for reducing the thermal load of an automatic transmission of a motor vehicle in an emergency operation in which during the emergency operation of the transmission, a program module of an electronic engine control, independently of the transmission presets an admissible maximum engine torque for the emergency operation. As an admissible maximum engine torque for the emergency operation, a constant value can be preset here. However, in a complex function, the admissible engine torque can also be preset, depending on an engine rotational speed, in such a manner that the admissible engine torque in a rotational speed range between zero or engine idling speed up to the stall rotational speed of the torque converter, is reduced to a defined stall speed value and in a range of the engine rotational speed between stall speed and a maximum engine rotational speed admissible for the emergency operation, a maximum engine torque corresponding to the normal operation is admitted and in a range above the maximum engine rotational speed admissible for the emergency operation is completely ruled out.

This definition of the driving torque of the vehicle which also leads to a definition of the vehicle speed constitutes an easy, but effective step against thermal overstress and wear due to heat of components of the automatic transmission and against premature thermal aging of the oil, both in relation to an electrohydraulically controlled multi-step automatic transmission of conventional type and in relation to a CVT transmission. It is clear to the expert that this can also be similarly transferred to an automated mechanical transmission, such as a double-clutch transmission, insofar as this transmission has at its disposal an emergency gear draft. In particular, this protective function can also be used in relation to a converter automatic transmission as mechanical protection in the emergency operation, in case the possible transmission input torque, as result of the torque increase specific to the converter, can exceed an admissible input torque specific to the transmission. An inadmissible overstepping of the admissible transmission input torque in normal operation of the transmission being prevented by a reduction of the prime mover torque initiated by the electronic transmission control, when needed.

Corresponding to the kind of the existing emergency operation of the transmission, that is, depending on whether there is a "genuine" emergency program with completely deficient electronic control with the consequence of an extensively restricted driveability of the motor vehicle or whether there has been activated only an alternative driving program specific to the deficiency or an alternative function specific to the deficiency with the consequence of a more or less limited driveability of the motor vehicle. Corresponding to the type of torque reduction of the prime mover, a reduction of the performance of the motor vehicle results in the emergency operation of the transmission, especially of the starting performance, clearly traceable by the driver.

When driving, the motor vehicle during emergency operation of the transmission, there arises the following problem: the driver naturally associates his accelerator pedal position with a performance appearing on the strength of the driver learning the relationship between accelerator pedal angle and performance in the normal driving operation. But, in the emergency operation of the transmission, the learned relationship no longer exists as a result of the torque limitation on the side of the prime mover. In a natural manner, the driver will automatically try, when starting the emergency operation, to immediately compensate the allegedly deficient engine performance related to his accelerator pedal position by a strengthened accelerator pedal actuation or a larger accelerator pedal angle. The driver also reacts similarly in natural manner to a reduced performance after starting in emergency operation. In emergency operation, he will always preset a somewhat larger accelerator pedal angle than in the normal operation of the transmission when the actually available performance does not correspond to his expectations.

Especially when the emergency operation is combined only with limitations of the driveability of the motor vehicle not significantly traceable for the driver (such as quite possible in an alternative driving program), this emergency operation can also be activated over a longer period of time or a longer distance with the consequence that the driver becomes accustomed to the reduced performance of the motor vehicle compared to the normal operation and also revises the originally learned interrelation between accelerator pedal actuation or accelerator pedal position and performance.

If there now occurs a sudden change from emergency operation back to normal operation of the transmission, the driver is startled, especially by the starting performance of the motor vehicle again available in full force. His accelerator pedal actuation or accelerator pedal position adapted to the previous emergency operation still activated produces an occasionally clearly higher vehicle acceleration than expected. A change from the emergency operation back to normal driving operation of the transmission can occur, for example, after a new start of the prime mover or after a supply voltage reset of the electronic transmission control, but also, for example, automatically during the driving operation with permanent voltage supply of the electronic transmission control in activated or not activated gear of the transmission. On account of the highest possible availability sought of the motor vehicle, a change from emergency operation back to normal operation of the transmission is suitable in itself and also desired and can result, for example, always when a previously diagnosed deficiency of the transmission, of the transmission control, or of the data communication between transmission control and engine control no longer exists. However, as shown, this can also lead to driving situations critical to safety.

The problem on which this invention is based is to provide an automatic or automated transmission of motor vehicle and a method for control of the transmission in which, in an emergency operation of the transmission, the performance of the motor vehicle is limited compared to a normal operation and in which, when changing from emergency operation back to normal operation of the transmission, driving situations critical to safety are prevented.

DETAILED DESCRIPTION OF THE INVENTION

The invention is based on a method for control of an automatic or automated transmission for a motor vehicle in which, during an emergency operation of the transmission, a performance of the motor vehicle, especially a maximum admissible engine torque and/or a maximum admissible engine rotational speed of a prime mover of the motor vehicle connected or connectable with the transmission and/or a maximum admissible transmission input torque and/or a maximum admissible transmission rotational speed are limited compared to a normal operation. To prevent driving situations critical to safety when changing from the emergency operation back to the normal operation of the transmission, the starting performance of the motor vehicle is limited for a period of time.

In a first development of the timed limitation of the starting performance of the motor vehicle, it is proposed that when changing from emergency operation back to normal operation, the limitation of the engine torque or of the engine rotational speed or of the transmission input torque or of the transmission input rotational speed acting in the emergency operation be deactivated via a time function arbitrary per se. For this purpose, the maximum admissible engine torque or the maximum admissible engine rotational speed or the maximum admissible transmission input torque or the maximum admissible transmission input rotational speed, starting from the moment of change from emergency operation back to normal operation, is increased linearly time controlled or progressively time controlled up to a value admissible in the normal operation.

In a second development of this timed limitation of the starting performance of the motor vehicle, it is proposed that when changing from emergency operation back to normal operation of the transmission, the limitation acting in the emergency operation of the engine torque or of the engine rotational speed or of the transmission input torque or of the transmission input rotational speed be deactivated depending on events. The maximum admissible engine torque or the maximum admissible engine rotational speed or the maximum admissible transmission input torque or the maximum admissible transmission input rotational speed is preferably gradually increased up to a value admissible in the normal operation depending on the number of starting operations of the motor vehicle after the change from emergency operation back to normal operational.

In a third development of this timed limitation of the starting performance of the motor vehicle, it is proposed that, when changing from emergency operation back to normal operation of the transmission, the limitation acting in the emergency operation of the engine torque or of the engine rotational speed or of the transmission input torque or of the transmission input rotational speed be activated a gradient of the engine torque and/or a gradient of the engine rotational speed and/or a gradient of the transmission input torque and/or a gradient of the transmission input rotational speed, starting from the change from emergency operation back to normal operation, being timed limited. For this purpose, for example, a maximum admissible gradient of the engine torque or a maximum admissible gradient of the engine rotational speed or a maximum admissible gradient of the transmission input torque or a maximum admissible gradient of the transmission input rotational speed, starting from the moment of change from emergency operation back to normal operation, can be timed increased linearly or progressively up to a value admissible in the normal operation.

In a fourth development of this timed limitation of the starting performance of the motor vehicle, it is proposed that when changing from emergency operation back to normal operation of the transmission, the limitation acting in the emergency operation of the engine torque or of the engine rotational speed or of the transmission input torque or of the transmission input rotational speed be deactivated, a gradient of the engine torque is gradually limited depending on events and/or a gradient of the engine rotational speed and/or a gradient of the transmission input torque and/or a gradient of the transmission input rotational speed, starting from the change from emergency operation back to normal operation. A maximum admissible gradient of the engine torque or a maximum admissible gradient of the engine rotational speed or a maximum admissible gradient of the transmission input torque or a maximum admissible gradient of the transmission input rotational speed are preferably gradually increased depending on the number of starting operations after the change from emergency operation back to normal operation up to a value admissible in the normal operation.

In a fifth development of this timed limitation of the starting performance of the motor vehicle, it is proposed that when changing from emergency operation back to normal operation of the transmission, the limitation acting in the emergency operation of the engine torque or of the engine rotational speed or of the transmission input torque or of the transmission input rotational speed be deactivated, predefined gearshift consequences—especially downshifts via several gears and downshifts in one gear or a transmission ratio with defined high vehicle acceleration excess—starting from the change from emergency operation back to normal operation, is timely suppressed or timely prohibited. Hence, according to the time function, all gears or all possible ratio ranges of the transmission are again made successively available to the driver, starting from the return to normal operation.

In a sixth development of this timed limitation of the starting performance of the motor vehicle, it is proposed that when changing from emergency operation back to normal operation of the transmission, the limitation acting in the emergency operation of the engine torque or of the engine rotational speed or of the transmission input torque or of the transmission input rotational speed be deactivated, predefined gearshift consequences—especially downshifts via several gears and downshifts in one gear or a transmission ratio with predefined high vehicle acceleration excess—starting from the change from emergency operation back to normal operation is gradually suppressed or gradually prohibited depending on events. These predefined gearshift consequences are preferably gradually admitted starting from the change of emergency operation back to normal operation depending on the number of starting operations of the motor vehicle after the change from emergency operation back to normal operation. Successively, all gears or all possible ratio changes of the transmission are again made available to the driver.

In all the developments of the timed or events-dependent definition of the starting performance of the motor vehicle, in addition, it is also possible to take into account the seriousness of deficiency of the event which had in the first place, led to the emergency operation. In all the developments of the timed or events-dependent limitation of the starting performance of the motor vehicle, the magnitude of the torque reduction acting in the emergency operation, likewise, can also be taken into account.

The inventive method is advantageously independent of the moment or operating state of the vehicle at which the emergency operation was changed back to the normal operation of the transmission. The change from emergency operation back to normal operation of the transmission can thus result, for example, after a supply voltage reset of an electronic transmission control or after a new start of the prime mover. But the change from emergency operation back to normal operation of the transmission can also occur when the electronic transmission control has been supplied with voltage, for example, in activated neutral or parking position of the transmission, or when the previously activated neutral or parking position of the transmission is left for a drive position of the transmission, or during continued driving operation of the motor vehicle with activated driving position of the transmission.

The inventive automatic or automated motor vehicle transmission comprising one electronic transmission control for control of the transmission in a normal operation, controlled according to the inventive method, is in principle of arbitrary construction and can be designed, for example, as stepped automatic transmission, as continuously variable automatic transmission, as automated mechanical transmission with one starting element, or also as automated or automatic shifting mechanical transmission designed as double-clutch transmission.

The invention claimed is:

1. A method of controlling one of an automatic and automated transmission of a motor vehicle, the method comprising the steps of:
    limiting, during an emergency operation as compared to a normal operation of the transmission, at least one of a maximum admissible engine torque, a maximum admissible engine rotational speed of a prime mover of the motor vehicle which is one of connected or connectable with the transmission, a maximum admissible transmission input torque, and a maximum admissible transmission input rotational speed; and
    time limiting a starting performance of the motor vehicle after a change from the emergency operation back to the normal operation of the transmission.

2. The method according to claim 1, further comprising the step of deactivating, via a time function, the limitation of one of the engine torque, the engine rotational speed, the transmission input torque, and the transmission input rotational speed, during the change from the emergency operation back to the normal operation of the transmission.

3. The method according to claim 2, further comprising the step of linearly increasing with time control, up to a value admissible in the normal operation, of one of the maximum admissible engine torque, the maximum admissible engine rotational speed, the maximum admissible transmission input torque, and the maximum admissible transmission input rotational speed, from a moment of change from the emergency operation back to the normal operation.

4. The method according to claim 1, further comprising the step of progressively increasing with time control up to a value admissible in the normal operation one of the maximum admissible engine torque, the maximum admissible engine rotational speed, the maximum admissible transmission input torque, and the maximum admissible transmission input rotational speed, from a moment of change from the emergency operation back to the normal operation.

5. The method according to claim 1, further comprising the step of gradually deactivating, depending on events during the change from the emergency operation back to the normal operation of the transmission, one of the limitation acting in the emergency operation of the engine torque, the engine rotational speed, the transmission input torque, and the transmission input rotational speed.

6. The method according to claim 5, further comprising the step of gradually increasing, depending on a number of starting operations of the vehicle up to a value admissible in the normal operation, one of the maximum admissible engine torque, the maximum admissible engine rotational speed, the maximum admissible transmission input torque, and the maximum admissible transmission input rotational speed, after the change from the emergency operation back to the normal operation.

7. The method according to claim 1, further comprising the step of:
    deactivating, during the change from the emergency operation back to the normal operation of the transmission, one of the limitation acting in the emergency operation of the engine torque, the engine rotational speed, the transmission input torque, the transmission input rotational speed; and
    time limiting at least one of a gradient of the engine torque, a gradient of the engine rotational speed, a gradient of the transmission input torque, and a gradient of the transmission input rotational speed, starting from the change from the emergency operation back to the normal operation.

8. The method according to claim 7, further comprising the step of time-controlling, one of a maximum admissible gradient of the engine torque, a maximum admissible gradient of the engine rotational speed, a maximum admissible gradient of the transmission input torque, and a maximum admissible gradient of the transmission input rotational speed, starting from a moment of change from the emergency operation back to the normal operation, linearly increased up to a value admissible in the normal operation.

9. The method according to claim 7, further comprising the step of time controlling progressively increased up to a value admissible in normal operation one of a maximum admissible gradient of the engine torque, a maximum admissible gradient of the engine rotational speed, a maximum admissible gradient of the transmission input torque, and a maximum admissible gradient of the transmission input rotational speed, departing from a moment of change from the emergency operation back to the normal operation.

10. The method according to claim 1, further comprising the step of:

deactivating in the change from the emergency operation back to the normal operation of the transmission, one of the limitation acting in the emergency operation of the engine torque, the engine rotational speed, the transmission input torque, and the transmission input rotational speed, and gradually limiting, depending on events, at least one of a gradient of the engine torque, a gradient of the engine rotational speed, a gradient of the transmission input torque, and a gradient of the transmission input rotational speed, starting from the change from the emergency operation back to the normal operation.

11. The method according to claim 10, further comprising the step of gradually increasing up to a value admissible in normal operation, one of a maximum admissible gradient of the engine torque, a maximum admissible gradient of the engine rotational speed, maximum admissible gradient of the transmission input torque, and a maximum admissible gradient of the transmission input rotational speed, depending on a number of starting operations of the motor vehicle after the change from the emergency operation back to the normal operation.

12. The method according to claim 1, further comprising the step of:
   deactivating in the change from the emergency operation back to the normal operation of the transmission, one of the limitation acting in the emergency operation of the engine torque, the engine rotational speed, the transmission input torque, and of the transmission input rotational speed, and
   time suppressing or time prohibiting predefined gearshift consequences starting from the change from the emergency operation back to the normal operation.

13. The method according to claim 1, further comprising the step of deactivating one of the limitation acting in the emergency operation of the engine torque, the engine rotational speed, the transmission input torque, and the transmission input rotational speed during the change from the emergency operation back to the normal operation of the transmission; and
   one gradually suppressing depending on events and gradually prohibiting depending on predefined events, gearshift consequences starting from the change from the emergency operation back to the normal operation.

14. The method according to claim 13, further comprising the step of gradually admitting predefined gearshift consequences starting from the change from the emergency operation back to the normal operation, depending on a number of starting operations of the motor vehicle after the change from the emergency operation back to the normal operation.

15. The method according to claim 12, further comprising the step of downshifting predefined gearshift consequences via several gears.

16. The method according to claim 12, further comprising the step of providing downshifts of one of a gear and a transmission ratio with defined excess high vehicle acceleration for the predefined gearshift consequences.

17. The method according to claim 1, further comprising the step of allowing the timed limitation of the starting performance of the motor vehicle to occur depending on an error gravity of an event causing the emergency operation.

18. The method according to claim 1, further comprising the step of allowing the timed limitation of the starting performance of the motor vehicle to occur depending on a torque reduction acting in the emergency operation.

19. The method according to claim 1, further comprising the step of carrying out the change from the emergency operation back to the normal operation of the transmission independently on a state of operation of the vehicle.

20. The method according to claim 1, further comprising the step of allowing during the change from the emergency operation back to the normal operation of the transmission to occur after at least one of a supply voltage reset of an the electronic transmission control and a new start of the prime mover.

21. The method according to claim 1, further comprising the step of allowing the change from the emergency operation back to the normal operation of the transmission to occur while an electronic transmission control is supplied with voltage.

22. The method according to claim 21, further comprising the step of allowing the change from the emergency operation back to the normal operation of the transmission to occur during one of an activated neutral position of the transmission, a parking position of the transmission, a discontinuation of a previously activated neutral position to a driving position of the transmission and a discontinuation of a previously activated parking position of the transmission to a driving position of the transmission.

23. The method according to claim 21, further comprising the step of allowing the change from the emergency operation back to the normal operation of the transmission to occur during one of permanent driving operation of the motor vehicle and in activated driving position of the transmission.

24. An automatic or automated motor vehicle transmission having one electronic transmission control for control of the transmission in a normal operation and being controlled by a method of controlling one of an automatic and automated transmission of a motor vehicle, the method comprising the steps of:
   limiting during emergency operation, as compared to normal operation of the transmission, at least one of a maximum admissible engine torque, a maximum admissible engine rotational speed of a prime mover of a motor vehicle which is one of connected or connectable with the transmission, a maximum admissible transmission input torque, and a maximum admissible transmission input rotational speed; and
   time limiting a starting performance of the motor vehicle after the change from emergency operation back to normal operation of the transmission.

25. The method according to claim 24, further comprising the step of designing the transmission as one of a stepped automatic transmission, a continuously variable automatic transmission, an automated mechanical transmission with one starting element, and an automatic or automatically shifting mechanical transmission of a double-clutch transmission.

* * * * *